United States Patent
Pawar et al.

(10) Patent No.: US 9,907,004 B1
(45) Date of Patent: Feb. 27, 2018

(54) CONTROL OF TRANSITION BETWEEN OPERATING MODES BASED ON AIR INTERFACE CONGESTION AND INTERRUPTION-SENSITIVITY OF COMMUNICATION

(71) Applicant: Sprint Spectrum L.P., Overland Park, KS (US)

(72) Inventors: Hemanth B. Pawar, Brambleton, VA (US); Krishna Sitaram, Chantilly, VA (US); Chunmei Liu, Great Falls, VA (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 87 days.

(21) Appl. No.: 15/163,964

(22) Filed: May 25, 2016

(51) Int. Cl.
  *H04W 36/22* (2009.01)
  *H04W 68/02* (2009.01)
  *H04W 28/02* (2009.01)

(52) U.S. Cl.
  CPC ....... *H04W 36/22* (2013.01); *H04W 28/0242* (2013.01); *H04W 28/0247* (2013.01); *H04W 68/02* (2013.01)

(58) Field of Classification Search
  None
  See application file for complete search history.

(56) References Cited

U.S. PATENT DOCUMENTS

| | | | |
|---|---|---|---|
| 9,185,730 B2* | 11/2015 | Zhao | H04W 76/02 |
| 2010/0135206 A1* | 6/2010 | Cherian | H04W 36/0066 370/328 |
| 2011/0122862 A1* | 5/2011 | Yun | H04L 12/5692 370/352 |
| 2011/0176414 A1* | 7/2011 | De Franca Lima | H04L 47/12 370/230 |
| 2011/0195714 A1* | 8/2011 | Sawinathan | H04W 60/005 455/435.1 |
| 2012/0064885 A1* | 3/2012 | Ramachandran | H04W 68/12 455/423 |
| 2016/0278096 A1* | 9/2016 | Watfa | H04W 28/0205 |

FOREIGN PATENT DOCUMENTS

WO    WO 2013/134699    9/2013

* cited by examiner

*Primary Examiner* — Brian Roberts (57) ABSTRACT

A method and system for dynamically controlling transition of a UE between operating modes based on a consideration of air interface congestion and interruption-sensitivity of communication. The UE operates by default in a first mode such as a circuit-switched-fallback (CSFB) mode. While so operating, a determination is made that the UE's serving air interface is threshold highly congested. In response, if the UE is not engaged in interruption-sensitive communication, the UE then transitions from operating in the first mode to operating in a second mode such as a non-CSFB mode (e.g., a single-radio LTE (SRLTE) mode).

20 Claims, 4 Drawing Sheets

CONTROL OF TRANSITION BETWEEN OPERATING MODES BASED ON AIR INTERFACE CONGESTION AND INTERRUPTION-SENSITIVITY OF COMMUNICATION

BACKGROUND

A typical wireless communication system includes one or more base stations, each radiating to define one or more coverage areas, such as cells and cell sectors, in which user equipment devices (UEs) such as cell phones, tablet computers, tracking devices, embedded wireless modules, and other wirelessly equipped communication devices (whether or not user operated), can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define downlink control channels for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system, the UE may detect a reference signal and read system information broadcast from a base station and may engage in a process to register itself with the base station and generally by the system. For instance, the UE may transmit an attach or registration message on an uplink control channel to the base station, and the base station and/or supporting infrastructure may then responsively authenticate and authorize the UE for service, establish a record indicating where in the system the WCD is operating, establish local profile or context records for the UE, and provide an attach accept or registration response message to the UE. Thereafter, the UE may then be served by the system in an idle mode or a connected/active mode. In the idle mode, the UE may monitor a downlink control channel to check for page messages and other information regarding incoming communications and may similarly transmit uplink control signaling to initiate communications or for other reasons. In the connected/active mode, the UE may have particular traffic channel resources assigned by the base station, which the UE may use to engage in communication of bearer traffic and the like.

OVERVIEW

In some areas, service providers may operate a hybrid wireless communication system that includes at least two radio access networks (RANs) and functionality to internetwork between the RANs. In such an arrangement, a UE may acquire connectivity with and be served by one of the RANs and may at some point transition to instead connect with and be served by another of the RANs.

An example of such a hybrid wireless communication system is one that includes a first RAN providing LTE service to support mobile broadband data communication and a second RAN providing legacy CDMA or GSM service to support traditional voice calls and/or other services. In such a system, a UE may connect with and be served by the LTE network by default, to facilitate engaging in data communication, and the UE may then transition to be served by the legacy network when necessary to engage in a voice call or other legacy network service.

To facilitate this, a UE that registers with and is served by the LTE network in an idle or connected mode may also separately register with the legacy network so that the UE can place and receive calls as necessary. There are at least two approaches for doing this in practice.

In a first approach, the UE registers with the legacy network via the LTE network, and then call setup signaling between the legacy network and the UE can pass via the LTE network and LTE air interface. For instance, once the UE is registered with and served by the LTE network, the UE may transmit to its serving LTE base station a legacy-network registration message, and the LTE network may pass that registration message via an inter-network connection (e.g., via an interworking server) to the legacy network, so that the legacy network will record the fact that the UE is accessible via the LTE network. While the UE is then served by the LTE network, the UE may thus conveniently receive legacy-network page messages and engage in other legacy-network call-setup signaling via the LTE network.

Thus, while so served by the LTE network with this first approach, when the UE seeks to place a voice call, the UE transmits a legacy-network call-origination message to the UE's serving LTE base station, and the LTE network passes that call-origination message via the inter-network connection to the legacy network. Through possibly additional signaling between the legacy network and the UE via the LTE network, the legacy network may then set up the voice call and, when appropriate, signal to the UE via the LTE network to cause the UE to transition from being served by the LTE network to instead being served by the legacy network, and the UE may then engage in the call served by the legacy network via a legacy-network air interface.

Similarly with this first approach, when the legacy network has an incoming call to connect to the UE, the legacy network may transmit a legacy-network page message to the UE via the LTE network (via the inter-network connection) or otherwise direct the LTE network to transmit such a page message to the UE, which the UE would receive from its serving LTE base station via the LTE air interface. Here too, through possibly additional signaling between the legacy network and the UE via the LTE network, the legacy network may then set up the voice call and, when appropriate, signal to the UE via the LTE network to cause the UE to transition from being served by the LTE network to instead being served by the legacy network, and the UE may then engage in the call served by the legacy network via a legacy-network air interface.

In a second approach, on the other hand, the UE temporarily tunes away from the LTE network to the legacy network and transmits to a legacy-network base station a registration message, so that the legacy network will record the fact that the UE is accessible directly via the legacy network's air interface, and the UE then tunes back to the LTE network for default operation. Further, in this approach, while the UE is served by the LTE network via the LTE air interface, the UE periodically tunes away from the LTE network to the legacy network to check for any page messages from legacy network to the UE.

Thus, while so served by the LTE network with this second approach, when the UE seeks to place a voice call, the UE tunes away from the LTE network to the legacy network and transmits directly via the legacy-network air interface to a legacy-network base station a call origination message, and the legacy network may then set up and serve the UE with the call via the legacy-network air interface. And likewise, when the legacy network has an incoming call to connect to the UE, the legacy network transmits a page message to the UE via the legacy-network air interface, which the UE detects and responds to at one of the UE's periodic tune-aways from the LTE network to the legacy network, and the legacy network may then likewise set up and serve the UE with the call via the legacy-network air interface.

In some cases, when a UE is served by an LTE network, the UE may be configured to operate with either of these approaches so as to facilitate engaging in voice calls or other legacy network services. To operate with the first approach, the UE may register with the legacy network via the LTE network, forgo periodically tuning away from the LTE network to the legacy network, and engage in legacy-network call-setup signaling via the LTE network as discussed above. Whereas, to operate with the second approach, the UE may register directly with the legacy network and then periodically tune away from the LTE network to the legacy network to check for pages as discussed above, and engage in legacy-network call-setup signaling directly via the legacy-network air interface.

In general, the first approach may be preferable to the second approach, since the first approach would allow the UE to more seamlessly transition from engaging in LTE service to engaging in a legacy-network call or other legacy-network service and to avoid the need to periodically tune-away from the LTE network the legacy network to check for legacy-network pages. Unfortunately, however, a downside to operating with the first approach is that the legacy-network call setup signaling (e.g., paging and other signaling) that passes between the legacy network and the UE would need to flow over the LTE air interface between the LTE base station and the UE. As that LTE air interface may have limited resources for serving UEs with data communication, it could be preferable in some situations to not burden the LTE air interface with legacy-network call setup signaling, and thus to instead have the UE operate with the second approach. This may especially be the case when the LTE air interface is highly congested (e.g., highly loaded with extensive air interface signaling and/or bearer traffic).

To address these or possibly other concerns, the present disclosure provides a method and system for dynamically controlling operation of a UE. In particular, the disclosure provides for controlling transition of a UE between operating modes such as those discussed above, based on a consideration of air interface congestion and interruption-sensitivity of the UE's communication. The disclosed process can work with respect to any two RANs, referred to as a first RAN and a second RAN. However, for illustration, and without restriction, the disclosure will focus on a scenario where the UE is served by an LTE network and would transition to a legacy CDMA network to engage in a voice call or other such service (generally a "call") served by the CDMA network. In that scenario, operating with the first approach may be operating in a circuit-switched fallback (CSFB) mode, and operating with the second approach may be operating in a non-CSFB mode, such as in a single-radio-LTE (SRLTE) mode.

In accordance with the disclosure, the UE may operate by default with the first approach described above. While so operating and thus being served by the LTE network, the UE or network may then determine that the LTE air interface is threshold highly congested, and the UE or network then responsively determines whether the UE should then switch to operate instead with the second approach to help avoid burdening the LTE air interface with legacy-network call setup signaling. However, because operating with the second approach would involve periodically tuning-away from the LTE network, the UE or network will then further condition the UE's transitioning to second approach on a further determination that the UE is not engaged in interruption-sensitive communication (such as streaming video communication, gaming communication, or other packet-based real-time media communication).

Thus, in response to the congested state of the LTE air interface, and only if the UE is not engaged in interruption-sensitive communication, the UE will then transition from operating with the first approach to operating with the second approach (and the UE will otherwise continue to operate with the first approach). Further, while operating with the second approach, the UE or network may then subsequently determine that the LTE air interface is no longer threshold highly congested, and the UE may responsively revert to operating with the first approach.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a hybrid system in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
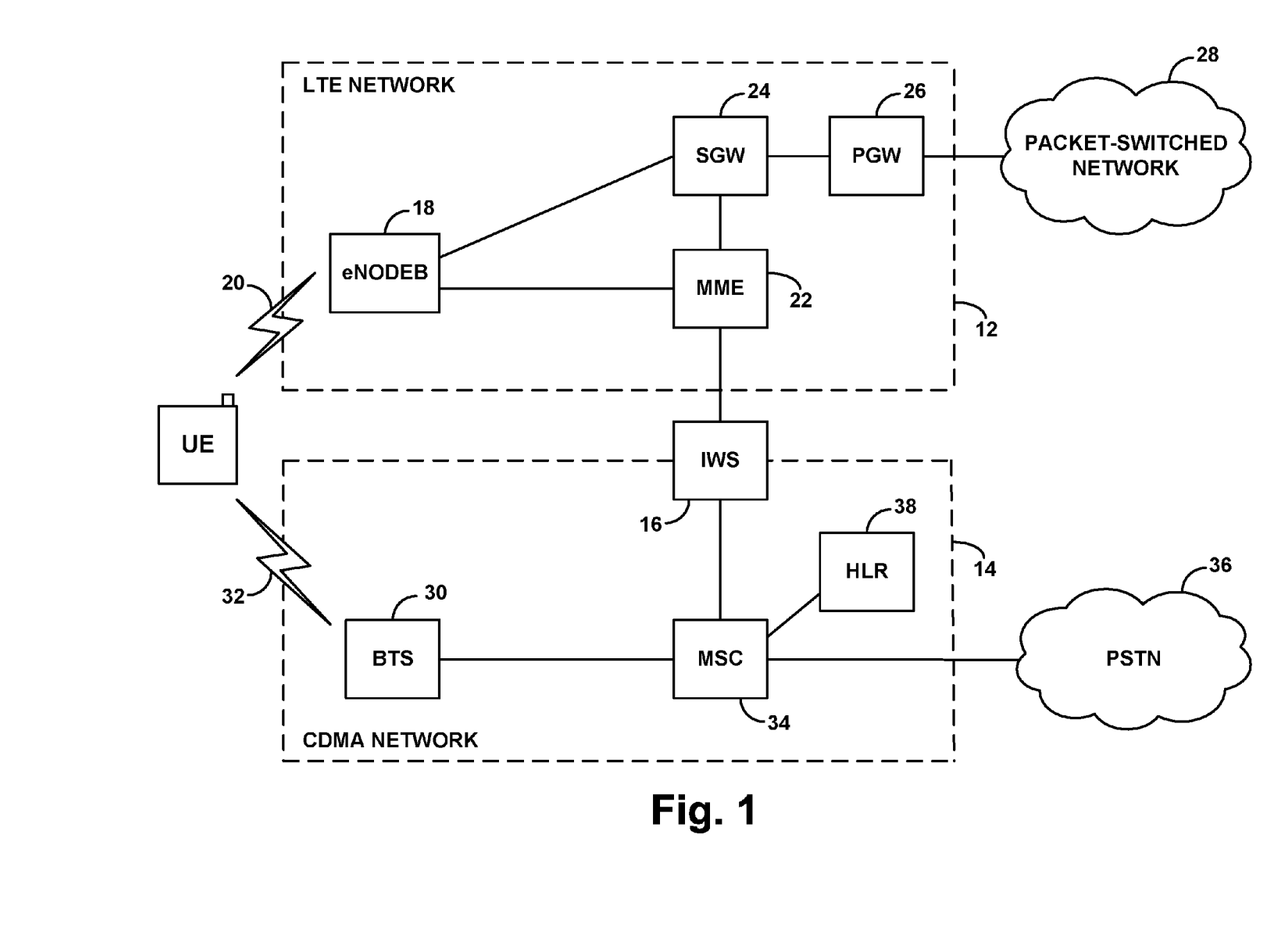
FIG. 1 is a simplified block diagram of a hybrid system in which aspects of the present disclosure can be implemented.

FIG. 1 depicts the hybrid system as including a representative LTE network 12 and a representative CDMA network 14. The LTE network primarily serves UEs with wireless packet-data communication service (including perhaps voice-over-packet service and other packet-based real-time media service), and the CDMA network primarily serves UEs with circuit-switched voice call service (but may also provide packet-data communication service and other types of service). Further, the hybrid system includes a representative IWS 16 interconnecting the networks, to facilitate exchange of signaling between the networks to facilitate CSFB operation as discussed above.

As shown by way of example, the LTE network 12 includes a representative LTE base station (evolved Node B (eNodeB)) 18, which includes an antenna structure and associated equipment for engaging in LTE communication over an LTE air interface defining an LTE coverage area 20. The eNodeB then has an interface with a mobility management entity (MME) 22 that serves as a signaling controller for the LTE network. Further, the eNodeB and MME each have a respective interface with a serving gateway (SGW) 24, which then has an interface with a packet data network gateway (PGW) 26 that provides connectivity with a packet-switched network 28.

The LTE air interface of coverage area 20 operates on a carrier that defines one or more frequency channels of defined bandwidth, such as 1.4 MHz, 5 MHz, 10 MHz, 15 MHz, or 20 MHz, with the downlink and uplink occupying separate frequency channels (in a frequency division duplex arrangement) or being multiplexed over time on a shared frequency channel (in a time division duplex arrangement). A representative LTE frequency channel is then divided over time into 10-millisecond frames and 1-millisecond sub-frames. Further, each subframe is divided over time into 67 microsecond symbol time segments, and the frequency bandwidth is divided into subcarriers that are typically spaced apart from each other by 15 kHz.

With this arrangement, every subframe essentially defines an array of resource elements, each of which is at a particular subcarrier and spans a particular symbol time segment, and these resource elements can be modulated to represent bits being communicated over the air interface.

Further, various resource elements are grouped for specific use. For instance, certain resource elements cooperatively define a control channel, other resource elements cooperatively define a reference-signal channel, and other resource elements are divided into groups defining physical resource blocks (PRBs) allocable by the eNodeB for carrying data to and from a served UE.

When a UE enters into coverage of the eNodeB in this arrangement, the UE may transmit an access request to the eNodeB on an uplink random access channel and engage in further signaling with the eNodeB to establish a Radio Resource Control (RRC) connection through which the UE and eNodeB can then engage in scheduled air interface communication. Through the RRC connection, the UE may then transmit an attach request to register with the LTE network, which the eNodeB would forward to the MME. And upon authenticating the UE, the MME would then engage in signaling with the eNodeB and SGW (and, in turn, the SGW engages in signaling with the PGW), to set up for the UE one or more bearers for carrying packet data between the UE and the packet-switched network 28. The UE may then be served by the LTE network in a connected mode or an idle mode.

The CDMA network 14, on the other hand, is shown including a representative CDMA base station (base transceiver station (BTS)) 30, which includes an antenna structure and associated equipment for engaging in CDMA communication over a CDMA air interface defining a coverage area 32 co-located at least in part with the LTE coverage area 20. The BTS then has an interface, possibly through a base station controller (not shown), with a mobile switching center (MSC) 34 that serves as a signaling controller and switch for the CDMA network and that provides connectivity with the PSTN 36. And the MSC has an interface with a home location register (HLR) 38 that stores location and profile information for UEs.

With this arrangement, normally when a UE enters into coverage of the BTS, the UE may register with the CDMA network by transmitting a CDMA registration message over the CDMA air interface to the BTS, which the BTS would forward to the MSC, and which the MSC may forward to the HLR. Upon authenticating the UE, the HLR and MSC may then establish a record that the UE is served by BTS 30, and the UE may be served by the CDMA network in an active mode or an idle mode. Thereafter, when a call comes in for the UE from the PSTN and the UE is in the idle mode, the MSC would page the UE by transmitting a CDMA page message to the BTS for transmission over the CDMA air interface, the UE would send a page response via the CDMA air interface, and the MSC would connect the call to the UE via the UE's serving BTS and the CDMA air interface.

In practice, a UE that is equipped for both LTE and CDMA service (e.g., having a radio and associated components for selectively engaging in LTE service or CDMA service) may be configured to prefer LTE service by default. Thus, when the UE shown in FIG. 1 is in coverage of both the LTE network and the CDMA network, the UE may register to be served by the LTE network as discussed above.

Further, in line with the discussion above, when the UE is served by the LTE network, the UE may then also operate by default in a CSFB mode to allow the UE to engage in voice calls or other service served by the CDMA network. To facilitate this, as discussed above, the UE may register with the CDMA network via the LTE network, by transmitting a CDMA registration message to the LTE eNodeB, which would then pass to the MME and in turn via the IWS to the MSC. Upon authenticating the UE, the HLR and MSC may then establish a record that the UE is served by LTE network via the IWS (rather than via a CDMA BTS), so that CDMA paging of the UE would then pass via the LTE network.

Thus, in the CSFB mode, when a call comes in for the UE from the PSTN, the MSC would page the UE by transmitting a CDMA page message or associated trigger via the IWS to the MME, which would cause the LTE eNodeB to transmit the CDMA page message over the LTE air interface to the UE. Upon receipt of this CDMA page message, the UE may then engage in further CDMA call setup signaling with the MSC via the LTE network, and the UE may then ultimately transition from being served by the LTE network over the LTE air interface to being served by the CDMA network over the CDMA air interface, and to engage in the call served by the CDMA network via the CDMA air interface.

Alternatively, also in line with the discussion above, when the UE is served by the LTE network, the UE may operate in a non-CSFB mode (e.g., an SRLTE mode) to allow the UE to engage in voice calls or other service served by the CDMA network. To facilitate this, as discussed above, while the UE is served by the LTE network, the UE may temporarily tune away from the LTE network (i.e., in wireless communication with the LTE eNodeB) to the CDMA network (i.e., in wireless communication with the CDMA BTS) and register directly with the CDMA network, by transmitting a CDMA registration request to the CDMA BTS, so that the CDMA network would become set to page the UE via the CDMA air interface rather than via the LTE network. Upon so registering directly with the CDMA network, the UE may then turn back to the LTE network. Further, as the UE is then served by the LTE network, the UE would then periodically tune away from the LTE network to the CDMA network (e.g., at scheduled paging occasions) to check for any page messages to the UE from the CDMA network and, upon finding such a page message, would respond via the CDMA air interface.

Thus, in the non-CSFB (e.g., SRLTE) mode, when a call comes in for the UE from the PSTN, the MSC would page the UE by transmitting a CDMA page message via the CDMA air interface to the UE, and after possibly further signaling with the UE via the CDMA air interface, the MSC may then connect the call through to the UE via the CDMA air interface.

With the arrangement of FIG. 1, in line with the discussion above, the present disclosure provides for dynamically controlling whether the UE operates in CSFB mode or non-CSFB (e.g., SRLTE) mode, based on consideration of congestion of the LTE air interface and consideration of whether the UE is engaged in interruption-sensitive communication. This process could be carried out by the UE and/or by the UE's serving network (e.g., by a serving eNodeB making determinations and sending directives, such as RRC connection reconfiguration messages, to the UE to cause the UE to operate in one mode or another). For simplicity, however, the process will be described mainly as carried out by the UE.

Per the discussion above, when the UE is served by the LTE network, the UE may by default operate in CSFB mode. While being served by the LTE network and operating in the CSFB mode, the UE will then determine that the LTE air interface is threshold highly congested.

The high congestion here could be defined in various ways. By way of example, the congestion level of the LTE air interface could be defined as a percentage or other measure of resources (e.g., resource elements or PRBs) used over time, such as a running average of percentage of downlink and/or uplink PRBs that the eNodeB has allocated for use and/or a percentage of control channel resource elements used, or the like. Or the congestion level of the LTE air interface could be defined in terms of number of UEs currently served by the eNodeB on the air interface, possibly weighed by their service levels or the like, among other possibilities. And the congestion level could be deemed "threshold high" by being higher than a defined threshold. For instance, the threshold could be a percentage of resource use, such as a percentage between 70 and 100% or the like, or a number of served UEs, also perhaps as a percentage of a maximum limit, such as a percentage between 80% and 100% or the like.

The UE could then determine in various ways that the LTE air interface is threshold highly congested. For example, the UE could receive from the eNodeB a wireless transmission that indicates the level of congestion, such as by specifying a numerical value or other value representing the level of congestion, which the UE could then compare with a defined threshold to determine whether the level of congestion is threshold high, or by specifying whether or not the congestion level is threshold high. This wireless transmission could be a unicast message from the eNodeB to the UE, such as an RRC connection reconfiguration message for instance, or it could be a message generally broadcast by the eNodeB for receipt by UEs, such as a system information block (SIB) broadcast message for instance. Other examples are also possible.

In response to determining that the LTE air interface is threshold highly congested, the UE will then make a determination of whether the UE is engaged in interruption-sensitive communication. At issue here is whether the UE is engaged in a communication via the LTE air interface that it would be preferable to not interrupt by tuning away for registration and to check for page messages on the CDMA air interface. Interruption-sensitive communications could be classified as packet-based real-time media communications, perhaps communications that the LTE network is set to provide with a guaranteed bit rate rather than as best-efforts traffic. Thus, examples of interruption-sensitive communication may be streaming audio communication, streaming video communication, gaming communication, video conference communication, medical application communication such as telesurgery, and security monitoring communication. Whereas, examples of communications that are not interruption-sensitive may be web browsing, e-mail communication, file transfer, and other more-typically best-efforts communication.

The UE may determine whether the UE is engaged in interruption-sensitive communication in various ways. By way of example, the UE may determine if the UE is currently RRC idle, in which case, the UE is not engaged in interruption-sensitive communication, or rather RRC connected, in which case the UE may be engaged in interruption-sensitive communication. Further, if the UE is RRC connected, then the UE could consider a quality of service class (e.g., quality of service class identifier (QCI)) of a bearer that the LTE network has established for the UE, as an indication of the type of communication in which the UE is engaged (which could be communication in which the UE is currently engaged or in which the UE is currently set to engage (by having a bearer or other such session over which to engage in the communication). For instance, if the UE has at least one guaranteed-bit-rate bearer with QCI 2-4 (e.g., video call, gaming, or video streaming), the UE could conclude that the UE is engaged in interruption-sensitive communication. Whereas, if the UE has only one or more default (non-guaranteed-bit-rate) bearers with QCI 6-9 (e.g., TCP based services, buffered video, file transfer, e-mail, chat, etc.), the UE could conclude that the UE is not engaged interruption-sensitive communication. Other examples are possible as well.

If the UE thus determines that the UE is engaged in interruption-sensitive communication, then the UE responsively continues to operate in the CSFB mode, rather than switching to operate in the non-CSFB mode. Whereas, if the UE determines that the UE not engaged in interruption-sensitive communication, then the UE responsively switches from operating in the CSFB mode to operating in the non-CSFB mode. In particular, while the UE is served by the LTE network, the UE temporarily tunes away from the LTE network to the CDMA network and re-registers directly with the CDMA network via the CDMA air interface, which would cause the CDMA network to update its registration for the UE to indicate that the UE is now reachable directly via the CDMA air interface. And the UE then tunes back to the LTE network and, while continuing to be served by the LTE network, then periodically tunes away from the LTE network to the CDMA network to check for CDMA page messages via the CDMA air interface, and so forth as noted above.

In addition, as further discussed above, while operating in the non-CSFB mode, the UE may then at some point determine that the LTE air interface is no longer threshold highly congested (e.g., that the LTE air interface is threshold lowly congested). Here again, the UE could make this determination in any of the ways discussed above, such as by receiving from the eNodeB a wireless transmission indicating that LTE air interface is not threshold congested. In response, the UE may then switch back to operating in the CSFB mode. In particular, the UE may re-register with the CDMA network via the LTE air interface and LTE network and thus enter into a state where the UE would receive CDMA pages and engage in other CDMA call setup signaling via the LTE network, and where the UE does not periodically tune away from the LTE network to the CDMA network to check for page messages.

Figure 2:
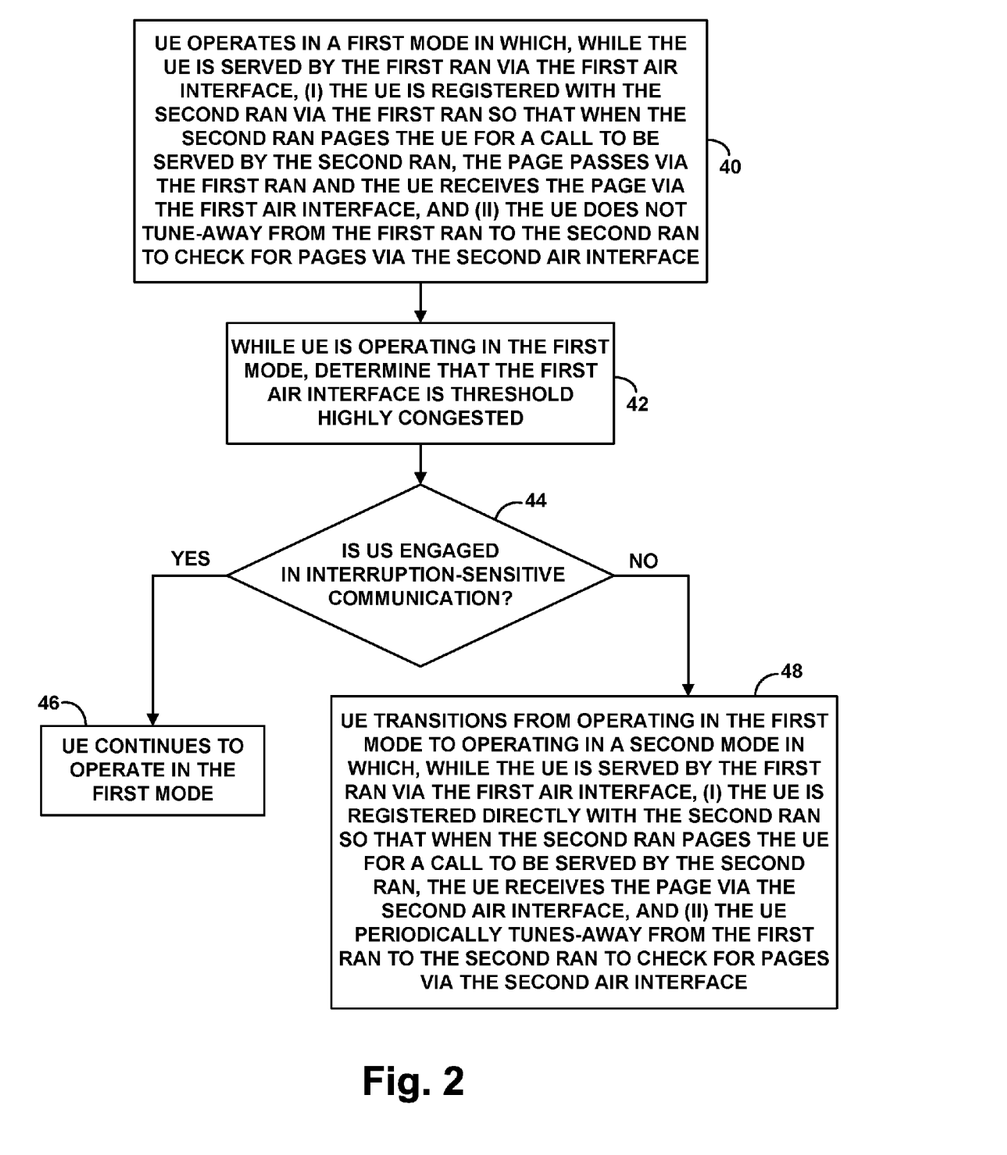
FIG. 2 is a flow chart depicting operations that can be carried out in accordance with the present disclosure.

FIG. 2 is next a flow chart depicting some of these operations, to facilitate controlling operation of a UE when the UE is served by a first RAN that provides a first air interface, where the first RAN is interconnected with a second RAN that provides a second air interface.

As shown in FIG. 2, at block 40, the UE operates in a first mode (e.g., CSFB) in which, while the UE is served by the first RAN via the first air interface, (i) the UE is registered with the second RAN via the first RAN so that when the second RAN pages the UE for a call to be served by the second RAN, the page passes via the first RAN and the UE receives the page via the first air interface, and (ii) the UE does not tune-away from the first RAN to the second RAN to check for pages via the second air interface.

At block 42, while the UE is operating in the first mode, the UE then determines that the first air interface is threshold highly congested, and at block 44, responsive to determining that the first air interface is threshold highly congested, the UE makes a determination of whether the UE is engaged in interruption-sensitive communication.

If the determination is that the UE is engaged in interruption-sensitive communication, then, at block 46, the UE continues to operate in the first mode. Whereas, if the determination is that the UE is not engaged in interruption-sensitive communication, then, at block 48, the UE transitions from operating in the first mode to operating in a second mode (e.g., non-CSFB (e.g., SRLTE)) in which, while the UE is served by the first RAN via the first air interface, (i) the UE is registered directly with the second RAN so that when the second RAN pages the UE for a call to be served by the second RAN, the UE receives the page via the second air interface, and (ii) the UE periodically tunes-away from the first RAN to the second RAN to check for pages via the second air interface.

In this process, while the UE is served by the first RAN via the first air interface, the UE is served by a first base station of the first RAN. And in that case, as noted above, the act of the UE determining that the first air interface is threshold highly congested could include the UE receiving from the base station a wireless transmission (e.g., a unicast configuration message from the base station to the UE, or a system broadcast message from the base station) indicating that the first air interface is threshold highly congested.

Further, as also discussed above, the act of the UE determining whether the UE is engaged in interruption-sensitive communication could be based on a quality of service class of a bearer over which the UE is set to engage in communication. In addition, the act of the UE transitioning from operating in the first mode to operating in the second mode could involve the UE temporarily tuning away from the first RAN to the second RAN, the UE registering with the second RAN via the second air interface, and the UE tuning back from the second RAN to the first RAN.

Moreover, as discussed above, while the UE is operating in the second mode, the process can additionally include the UE determining that the first air interface is no longer threshold highly congested, and, responsive to the UE determining that the first air interface is no longer threshold highly congested, the UE transitioning from operating in the second mode to operating in the first mode. Alternatively, the process could involve the UE automatically transitioning back to the first mode after a defined time period, such as by the UE starting a timer upon transitioning to the second mode and, upon expiration of the timer (a timeout period), transitioning from operating in the second mode to operating in the first mode.

Figure 3:
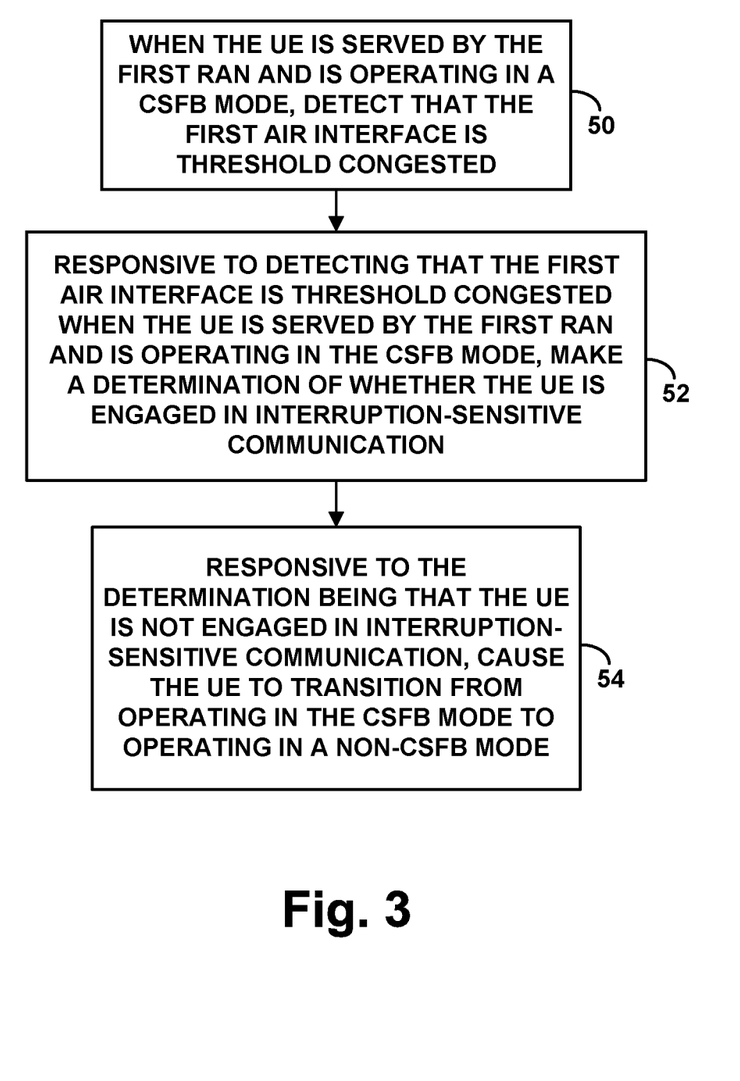
FIG. 3 is another flow chart depicting operations that can be carried out in accordance with the present disclosure.

FIG. 3 is next another flow chart depicting method in line with the discussion above, to control operation of a UE when the UE is served by a first RAN that provides a first air interface, where the first RAN is interconnected with a second RAN that provides a second air interface. Here again, this method can be carried out by the UE and/or by another entity (such as by a base station of the first RAN serving the UE).

As shown in FIG. 3, at block 50, when the UE is served by the first RAN and is operating in a CSFB mode, the method involves detecting that the first air interface is threshold congested. At block 52, the method then involves, responsive to detecting that the first air interface is threshold congested when the UE is served by the first RAN and is operating in the CSFB mode, making a determination of whether the UE is engaged in interruption-sensitive communication. And at block 54, the method then involves, responsive to the determination being that the UE is not engaged in interruption-sensitive communication, causing the UE to transition from operating in the CSFB mode to operating in a non-CSFB mode.

As discussed above, in the CSFB mode, the UE is served by the first RAN via the first air interface and, when the second RAN pages the UE for a voice call to be served by the second RAN, the UE receives the page via the first RAN and the first user interface. Whereas, in the non-CSFB mode, the UE is served by the first RAN via the first air interface, the UE periodically tunes away from the first RAN to the second RAN to check for pages over the second air interface and, when the second RAN pages the UE for a voice call to be served by the second RAN, the UE receives the page directly from the second RAN via the second air interface.

Figure 4:
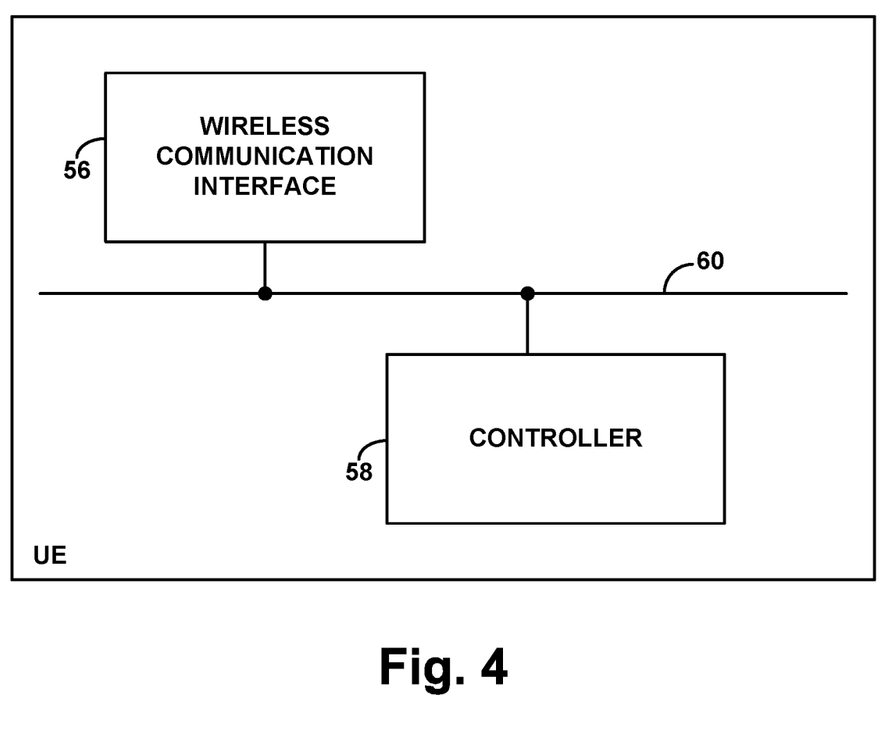
FIG. 4 is simplified block diagram of a UE operable in accordance with the present disclosure.

Finally, FIG. 4 is a simplified block diagram of an example UE operable in accordance with the present disclosure. As shown in FIG. 4, the example UE includes a wireless communication interface 56 and a controller 58, which could be integrated together or communicatively linked by a system bus or other connection mechanism 60.

The wireless communication interface 54 is configured to facilitate communication with the first RAN over the first air interface according to a first air interface protocol (e.g., LTE) for instance, and to facilitate communication with the second RAN over the second air interface according to a second air interface protocol (e.g., CDMA) for instance. As such, the wireless communication interface could be a single module that having shared components operable to selectively tune to a frequency of the first air interface protocol or a frequency of the second air interface protocol, and to selectively operate in accordance with the first air interface protocol or the second air interface protocol, or the wireless communication interface could include separate components for the first air interface protocol and for the second air interface protocol.

The wireless communication interface 54 could take various forms. By way of example, the wireless communication interface may include an antenna structure (e.g., one or more antennas) for engaging in air interface communication, and a radio module (e.g., one or more radios), such as mobile station modem chipsets or other modules, configured to selectively communicate with the first RAN via the first air interface and with the second RAN via the second air interface.

The controller is then configured to control operating mode of the UE at least while the UE is being served by the first RAN via the first air interface. As such, the controller could be integrated with the wireless communication interface, on a common chipset for instance, or could be provided separately. The controller could comprise one or more processing units (e.g., microprocessors), one or more non-transitory data storage modules (e.g., volatile and/or non-volatile storage components, such as magnetic, optical, or flash storage), and program instructions stored in the data storage and executable by the processing units to carry out various operations described herein. Alternatively or additionally, the controller could take other forms, including for instance application specific integrated circuits or the like, configured to carry out various described operations.

Accordingly, in line with the discussion above, the controller could cause the UE to operate by default in a first mode. Further, the controller could determine that the first air interface is threshold highly congested. And the controller could respond to determining that the first air interface is threshold highly congested by (i) making a determination of whether the UE is engaged in interruption-sensitive communication, (ii) if the determination is that the UE is engaged in interruption-sensitive communication, then allowing the UE to continue operating in the first mode, but (ii) if the determination is that the UE is not engaged in interruption-sensitive communication, then causing the UE to transition from operating in the first mode to operating instead in a second mode.

And per the discussion above, in the first mode, the UE is registered with the second RAN via the first RAN and is thus set to receive pages from the second RAN via the first RAN and the first air interface, and the UE does not tune-away from the first RAN to the second RAN to check for pages via the second air interface. Whereas, in the second mode, the UE is registered directly with the second RAN and is thus set to receive pages from the second RAN via the second air interface, and the UE tunes away periodically from the first RAN to the second RAN to check for pages via the second air interface. Various other features described above could be applied in this context as well.

Exemplary embodiments have been described above. Those skilled in the art will understand, however, that changes and modifications may be made to these embodiments without departing from the true scope and spirit of the invention.

We claim:

1. A method for controlling operation of a user equipment device (UE) when the UE is served by a first radio access network (RAN) that provides a first air interface, wherein the first RAN is interconnected with a second RAN that provides a second air interface, the method comprising:
    operating by the UE in a first mode in which, while the UE is served by the first RAN via the first air interface, (i) the UE is registered with the second RAN via the first RAN so that when the second RAN pages the UE for a call to be served by the second RAN, the page passes via the first RAN and the UE receives the page via the first air interface, and (ii) the UE does not tune-away from the first RAN to the second RAN to check for pages via the second air interface;
    while operating in the first mode, determining by the UE that the first air interface is threshold highly congested, and responsive to determining by the UE that the first air interface is threshold highly congested, making a determination by the UE of whether the UE is engaged in interruption-sensitive communication;
    if the determination is that the UE is engaged in interruption-sensitive communication, then continuing by the UE to operate in the first mode; and
    if the determination is that the UE is not engaged in interruption-sensitive communication, then transitioning by the UE from operating in the first mode to operating in a second mode in which, while the UE is served by the first RAN via the first air interface, (i) the UE is registered directly with the second RAN so that when the second RAN pages the UE for a call to be served by the second RAN, the UE receives the page via the second air interface, and (ii) the UE periodically tunes-away from the first RAN to the second RAN to check for pages via the second air interface.

2. The method of claim 1, wherein the first mode is circuit switched fallback (CSFB) mode, and wherein the second mode is non-CSFB mode.

3. The method of claim 1, wherein, while the UE is served by the first RAN via the first air interface, the UE is served by a first base station of the first RAN, and wherein determining by the UE that the first air interface is threshold highly congested comprises receiving by the UE from the base station a wireless transmission indicating that the first air interface is threshold highly congested.

4. The method of claim 3, wherein the wireless transmission is selected from the group consisting of a unicast configuration message from the base station specifically to the UE and a system broadcast message from the base station.

5. The method of claim 1, wherein making the determination of whether the UE is engaged in interruption-sensitive communication is based on a quality of service class of a bearer over which the UE is set to engage in communication.

6. The method of claim 1, wherein interruption-sensitive communication comprises communication selected from the group consisting of video streaming, video conference, security monitoring, gaming, and telesurgery.

7. The method of claim 1, wherein transitioning by the UE from operating in the first mode to operating in a second mode comprises:
   temporarily tuning away by the UE from the first RAN to the second RAN;
   registering by the UE with the second RAN via the second air interface; and
   tuning back by the UE from the second RAN to the first RAN.

8. The method of claim 1, further comprising:
   while the UE is operating in the second mode, determining by the UE that the first air interface is no longer threshold highly congested;
   responsive to determining by the UE that the first air interface is no longer threshold highly congested, transitioning by the UE from operating in the second mode to operating in the first mode.

9. The method of claim 1, further comprising:
   responsive to expiration of a timeout period, transitioning by the UE from operating in the second mode to operating in the first mode.

10. A method for controlling operation of a user equipment device (UE) when the UE is served by a first radio access network (RAN) that provides a first air interface, wherein the first RAN is interconnected with a second RAN that provides a second air interface, the method comprising:
   when the UE is served by the first RAN and is operating in a circuit-switched fallback (CSFB) mode, detecting that the first air interface is threshold congested; and
   responsive to detecting that the first air interface is threshold congested when the UE is served by the first RAN and is operating in the CSFB mode, (i) making a determination of whether the UE is engaged in interruption-sensitive communication, and (ii) responsive to the determination being that the UE is not engaged in interruption-sensitive communication, causing the UE to transition from operating in the CSFB mode to operating in a non-CSFB mode,
   wherein, in the CSFB mode, the UE is served by the first RAN via the first air interface and, when the second RAN pages the UE for a voice call to be served by the second RAN, the UE receives the page via the first RAN and the first user interface, and
   wherein, in the non-CSFB mode, the UE is served by the first RAN via the first air interface, the UE periodically tunes away from the first RAN to the second RAN to check for pages over the second air interface and, when the second RAN pages the UE for a voice call to be served by the second RAN, the UE receives the page directly from the second RAN via the second air interface.

11. The method of claim 10, carried out by the UE.

12. A user equipment device (UE) with dynamic operating mode, the UE comprising:
   a radio module configured to selectively communicate with a first radio access network (RAN) via a first air interface and with a second RAN via a second air interface; and
   a controller configured to control operating mode of the UE while the UE is being served by the first RAN via the first air interface, wherein, while the UE is so served by the first RAN via the first air interface, the controller (A) causes the UE to operate by default in a first mode, (B) determines that the first air interface is threshold highly congested, and (C) responsive to determining the first air interface is threshold highly congested, (i) makes a determination of whether the UE is engaged in interruption-sensitive communication, (ii) if the determination is that the UE is engaged in interruption-sensitive communication, then allows the UE to continue operating in the first mode, and (ii) if the determination is that the UE is not engaged in interruption-sensitive communication, then causes the UE to transition from operating in the first mode to operating instead in a second mode,
   wherein in the first mode, the UE is registered with the second RAN via the first RAN and is thus set to receive pages from the second RAN via the first RAN and the first air interface, and the UE does not tune-away from the first RAN to the second RAN to check for pages via the second air interface, and
   wherein in the second mode, the UE is registered directly with the second RAN and is thus set to receive pages from the second RAN via the second air interface, and the UE tunes away periodically from the first RAN to the second RAN to check for pages via the second air interface.

13. The UE of claim 12, wherein the first mode is circuit switched fallback (CSFB) mode, and wherein the second mode is non-CSFB mode.

14. The UE of claim 12, wherein, while the UE is served by the first RAN via the first air interface, the UE is served by a first base station of the first RAN, and wherein determining that the first air interface is threshold highly congested comprises receiving from the base station a wireless transmission indicating that the first air interface is threshold highly congested.

15. The UE of claim 14, wherein the wireless transmission is selected from the group consisting of a unicast configuration message from the base station specifically to the UE and a system broadcast message from the base station.

16. The UE of claim 2, wherein making the determination of whether the UE is engaged in interruption-sensitive communication is based on a quality of service class of a bearer over which the UE is set to engage in communication.

17. The UE of claim 12, wherein interruption-sensitive communication comprises communication selected from the group consisting of video streaming, video conference, security monitoring, gaming, and telesurgery.

18. The UE of claim 12, wherein the controller comprises a processing unit, non-transitory data storage, and program instructions stored in the data storage and executable by the processing unit.

19. The UE of claim 12, wherein the controller is further configured to determine, while the UE is operating in the second mode, that the first air interface is no longer threshold highly congested, and, responsive to so determining that the first air interface is no longer threshold highly congested, to cause the UE to transition from operating in the second mode to operating in the first mode.

20. The UE of claim 12, wherein the controller is further configured to respond to expiration of a timeout period by causing the UE to transition from operating in the second mode to operating in the first mode.

\* \* \* \* \*